United States Patent [19]

Paule et al.

[11] 4,216,582
[45] Aug. 12, 1980

[54] HEDGE TRIMMER

[75] Inventors: Kurt Paule, Stuttgart; Eberhard Vogel, Dettenhausen, both of Fed. Rep. of Germany

[73] Assignee: Robert Bosch GmbH, Stuttgart, Fed. Rep. of Germany

[21] Appl. No.: 962,756

[22] Filed: Nov. 21, 1978

[30] Foreign Application Priority Data

Nov. 23, 1977 [DE] Fed. Rep. of Germany ....... 2752234

[51] Int. Cl.² ............................................. B26B 19/02
[52] U.S. Cl. .......................................... 30/216; 30/223
[58] Field of Search ................. 30/216, 217, 218, 219, 30/220, 221, 222, 223, 224, 225

[56] References Cited

U.S. PATENT DOCUMENTS

| | | | |
|---|---|---|---|
| 2,465,694 | 3/1949 | Norwood | 30/221 |
| 2,559,725 | 7/1951 | Mansperger | 30/216 |
| 2,763,925 | 9/1956 | Asbury | 30/220 |
| 3,564,714 | 2/1971 | Wells | 30/223 |
| 3,897,630 | 8/1975 | Glover | 30/220 |

*Primary Examiner*—Jimmy C. Peters
*Attorney, Agent, or Firm*—Frishauf, Holtz, Goodman & Woodward

[57] ABSTRACT

A hedge trimmer has at least one moveable blade and a second blade. The second blade has trapezoidal teeth. The first blade has rectangular teeth which have a broadened end portion, but, contrary to the prior art, the teeth of the first blade are at least twice as long as those of the second blade. As in the prior art hedge trimmers, the broadest part of each tooth is defined by two juncture points, one on each side of the tooth. For additional safety, in accordance with the invention, the maximum distance between adjacent juncture points of adjacent teeth is 14 mm.

14 Claims, 4 Drawing Figures

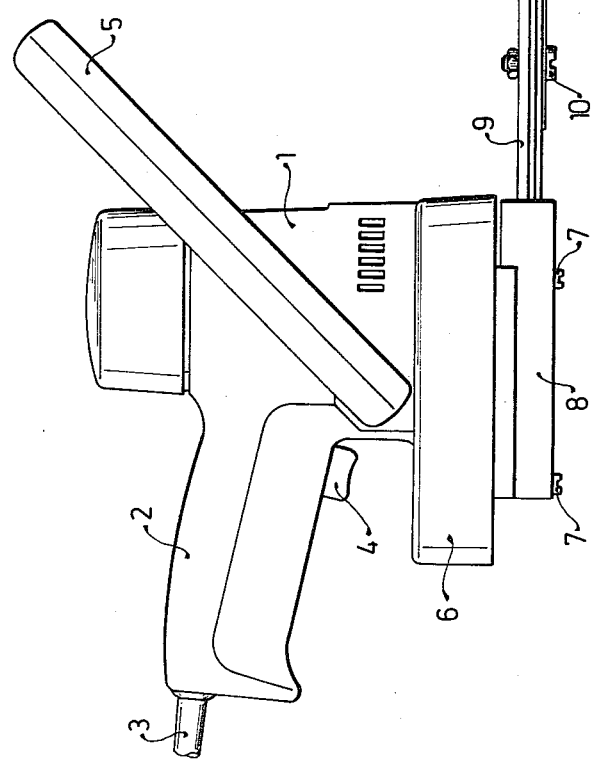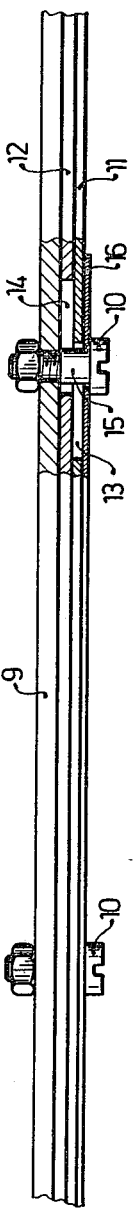

HEDGE TRIMMER

The present invention relates to hedge trimmers and, in particular, for hedge trimmers in which a first and second blade, each having teeth, are moved relative to each other for trimming hedges or bushes.

BACKGROUND AND PRIOR ART

Hedge trimmers are known in which a first blade has a plurality of teeth each having a broadened end portion. The broadest point of the end portion is defined by the juncture points of a first and second guide edge with, respectively, a first and second catching edge. Specifically, each guide edge extends outwardly from the juncture point while each catching edge extends inwardly therefrom. This broadening decreases the gap between teeth and therefore the probability that the operators fingers may be caught in the hedge trimmer. However, the safety factor of these hedge trimmers is still insufficient. In the known hedge trimmers, the blade having the teeth with the broadened and portion is stationary.

THE INVENTION

It is an object of the present invention to furnish a hedge trimmer in which the safety factor is considerably improved. According to the present invention the blade having the broadened teeth is the moveable blade. The moving guide edges of the broadened portion then serve to repel the fingers of the human hand which, of course, react completely differently from branches and twigs. The blade thus acts as a moving safety gate. Further, the length of the teeth having the broadened portion is at least twice the length of the teeth of the other blade. The lengthening of the teeth causes an additional distance to be introduced between the blade which serves as the moving safety gate and the trapezoidally shaped teeth of the other blade which constitute the danger points.

In preferred embodigments of the present invention the second blade can either be stationary or also a moveable blade. In a particularly preferred embodiment the distance between successive juncture points on the teeth of the first blade is at the most 14 mm.

DRAWINGS ILLUSTRATING A PREFERRED EMBODIMENT:

FIG. 1 shows a hedge trimmer with blade assembly in elevation;

FIG. 2 is an enlarged view of the blade assembly in elevation, partially in section;

Figure 3:
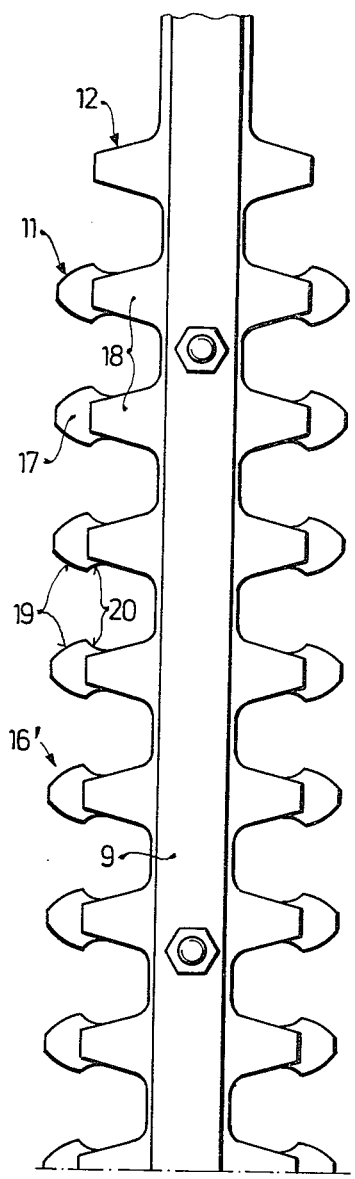
FIG. 3 is an enlarged horizontal projection of the blade assembly of a known hedge trimmer.

The hedge trimmer shown in FIGS. 1 and 2 has a motor housing 1 with a formed handle 2. Power for the hedge trimmer is supplied by a cord 3 which allows connection to an electrical outlet. A motor (not shown), located in motor housing 1, can be energized by activation of a trigger switch 4. A wraparound handle 5 allows easy handling of the hedge trimmer in any direction. A gear box housing 6 is fastened to motor housing 1. The gearing in gear box 6 changes the rotary motion of the motor into a reciprocating translatory motion. Screws 7 fasten a further housing 8 to housing 6. A carrier 9 is rigidly connected to housing 8. Carrier 9 is a long steel piece having four edges. Screws 10 guide two blades, 11 and 12, relative to carrier 9. Specifically, the blades have slots 13, 14 which extend in the lengthwise direction and through which pass screws 10 which have smooth cyclinderical shafts 15. The slots are covered by a long narrow cover sheet 16. The carrier, the blade, the cover sheet, and the screws which hold them together together constitute the blade assemblies 16', 116'.

Within housing 6, the blades are coupled to the gearing in such a way that a reciprocating translatory motion in opposite directions is inparted to the two blades in the lengthwise direction of the carrier. Up to this point, the hedge trimmer of the present invention is the same as known hedge trimmers, except that, in the known hedge trimmers having the blade construction shown in FIG. 3 the second blade is stationary.

The blade assembly of the known hedge trimmer is shown in horizontal projection in FIG. 3, allowing the shape of the teeth to be seen clearly. The first blade 11 has a plurality of teeth 17 extending in the direction perpendicular to the lengthwise axis of the blade. The teeth 17 extend over the trapezoidal teeth 18 of second blade 12 by approximately one-half the length of teeth 18. The teeth of the first blade have a broadened end portion which is defined by two guide edges 19 extending outwardly and two catching edges 20 extending inwardly from two juncture points between the two types of edges.

Figure 4:
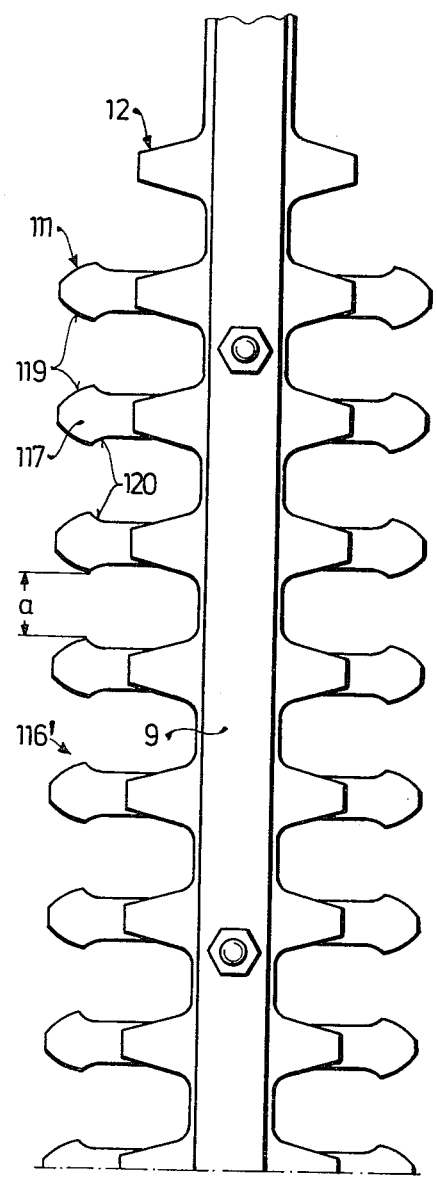
FIG. 4 is an enlarged horizontal projection of a blade assembly in accordance with the present invention.

The blade assembly 116', FIG. 4, corresponds to the blade assembly shown in FIG. 3 except for the construction of first blade 111. Where elements of blade 111 are the same as those in FIG. 3, they have the same reference numerals. Changed parts have reference numerals whose values are increased by 100.

The teeth 117 of first blade 111 are preferably substantially rectangular and at least twice as long as are the teeth of second blade 12; that is, they extend at least twice as far in a direction perpendicular to the lengthwise axis of the blade. The teeth of first blade 111 each have a broadened end portion defined by a first and second guide edge 119 each of which meets a corresponding one of catching edges 120 at a juncture point. Specifically, the guide edges diverge outwardly from the end face of the teeth to a juncture point while the catching edges converge inwardly. The teeth are spaced in such a manner that the distance, a, between adjacent juncture points of adjacent teeth is at the most 14 mm. The juncture point, which is the narrowest point between the first teeth, is about midway between the end faces of the first movable teeth, and the second teeth.

Since the present invention resides in the construction of the first blade and its oscillatory motion which together cause the first blade to act as an "oscillatory safety gate", the present invention can also be utilized in hedge trimmers in which the second blade 12 is stationary. For very simply constructed hedge trimmers the stationary second blade can be constructed to also constitute the carrier for the first blade, that is carrier 9 can be eliminated.

Various changes and modifications may be made within the scope of the inventive concept.

We claim:
1. In a hedge trimmer having a housing (1,2); adapted to be hand-held by an operator, a first blade (111) having first teeth (117)

a second blade (12) having a plurality of substantially trapezoidally shaped teeth (18)
and driving means in the housing for reciprocating said first blade relative to the housing and to said second blade, wherein
the first teeth (117) on the first blade each have a first predetermined length at least twice as long as the length of the teeth (12) on said second blade.

2. A hedge trimmer as set forth in claim 1, wherein each of said teeth (117) on said first blade (111) has a substantially rectangular shape.

3. Hedge trimmer as set forth in claim 2 wherein the distance between adjacent first teeth of the first blade in a zone adjacent the end portion of the first teeth is less than 14 mm.

4. A hedge trimmer as set forth in claim 1, wherein each of said plurality of first teeth (117) of said first blade (111) has a broaded end portion, each of said broadened end portions having an end face and tapering, divergent guide edges (119) extending to an enlarge portion wider than said end face, and convergent catching edges (120) respectively meeting said guide edges at a first and second juncture point.

5. A hedge trimmer as set forth in claim 4, wherein the distance between adjacent ones of said juncture points of said teeth of said first blade is less than 14 mm.

6. A hedge trimmer as set forth in claim 1, wherein said driving means comprises means for moving both said first and said second blades relative to the housing.

7. A hedge trimmer as set forth in claim 1 wherein each of said plurality of first teeth (117) of said first blade (111) has a broadened end portion, each of said broadened end portions having an end face and tapering, divergent guide edges (119) extended to an enlarged portion wider than said end face, said enlarged portion being located and spaced ahead of the end surfaces of said second teeth in a direction from the end faces of the first teeth.

8. Hedge trimmer as set forth in claim 7 including convergent catching edges (120) respectively meeting the guide edges at a juncture point at said enlarged portion.

9. Hedge trimmer as set forth in claim 7 wherein the enlarged portion wider than the end face is located about midway between the end faces of the second teeth and the end faces of the first teeth.

10. An access protected safety hedge trimmer having a housing;
a first blade (111) having a plurality of first projecting teeth thereon;
a second blade (12) having a plurality of second projecting teeth thereon, overlapping the teeth of the first blade;
means driving said first blade (111) relative to the housing and to the second blade;
means to prevent open access to the region of overlap of the teeth of the blades and provide a safety gate in advance of the cutting region formed by the overlap of the blades including
a projecting portion extending the length of the first teeth (117) of the first blade (111) to extend the overall projecting length of the first teeth substantially beyond the region of overlap of the teeth of said blades by at least twice the length of the second teeth,
the drive means driving said first blade (111) to move said first blade relative to said housing providing in operation, a movable oscillatory safety gate imparting moving, and hence warning sensation upon human contact with the projecting portion of the first blade before contact with the shorter second teeth in the region of overlap is possible.

11. Hedge trimmer as set forth in claim 10, wherein the outer end portion of the projecting portion of the first teeth includes a substantially spade-shaped guide portion having forwardly located guide surfaces (119) which diverge from the end face of teeth, and terminate in a broadened extension, and forming with the broadened extension of an adjacent tooth, a constricted opening.

12. Hedge trimmer as set forth in claim 11, wherein the distance (a) between adjacent ones of said broadened extensions is less than about 1½ cm.

13. Hedge trimmer as set forth in claim 11 wherein the first teeth are formed with converging catching surfaces (120) extending from said broadened extensions towards the remainder of the extended portion of said second teeth.

14. Hedge trimmer as set forth in claim 11, wherein said broadened extension, in the region of the constricted opening (a) is approximately midway between the end faces of the second teeth and the end faces of the first teeth.

* * * * *